(No Model.)
J. HARNEY.
WEIGHT ATTACHMENT FOR HORSESHOES.
No. 250,240. Patented Nov. 29, 1881.
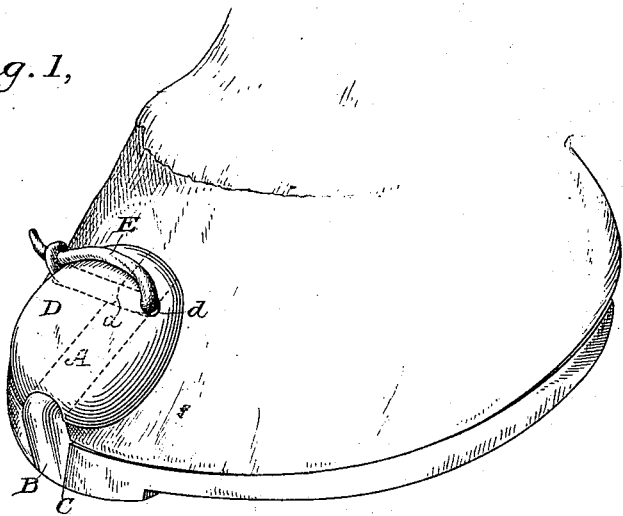
Fig. 1,
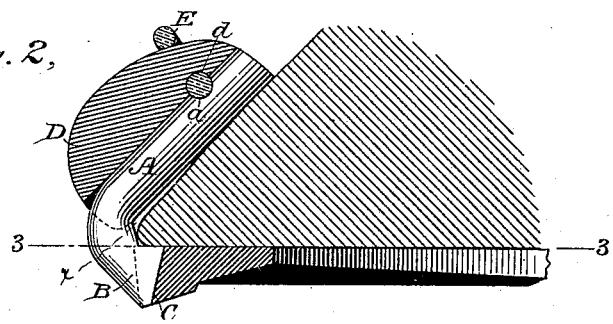
Fig. 2,
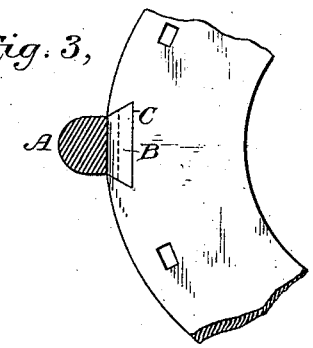
Fig. 3,
WITNESSES
Geo W. Breck
Ho. W. Elmore
INVENTOR
John Harney,
By his Attorneys
Baldwin, Hopkins & Peyton,

UNITED STATES PATENT OFFICE.

JOHN HARNEY, OF DUBUQUE, IOWA.

WEIGHT ATTACHMENT FOR HORSESHOES.

SPECIFICATION forming part of Letters Patent No. 250,240, dated November 29, 1881.

Application filed October 6, 1881. (No model.)

*To all whom it may concern:*

Be it known that I, JOHN HARNEY, of Dubuque, in the county of Dubuque and State of Iowa, have invented certain new and useful Improvements in Weight Attachments for Horseshoes, of which the following is a specification.

As is well known to horsemen, in training and trotting horses it is often desirable to weight the toe or side of the shoe, and it is important that the weight should not bear upon the hoof, for if it does the animal is timid in handling his feet, and the foot is also liable to become injured.

My invention consists in certain improvements whereby the desirable result above mentioned is attained, the weight-supporting clip or spur being seated directly in the shoe, and burning or cutting the hoof to apply the attachment being unnecessary.

In the accompanying drawings, Figure 1 is a perspective view showing my device applied. Fig. 2 is a cross-section through the weight, shoe, and hoof of the animal. Fig. 3 is a detail sectional view on the line 3 3 of Fig. 2.

The clip or spur A is formed of a somewhat angular shape. The lower end, which is bent under, carries the upright dovetail head B. A recess or bend, *x*, in which the toe of the hoof fits, is thus formed between the dovetail head and the straight portion of the spur. The head B fits flushly into a correspondingly-shaped socket, C, in the shoe, and is inserted therein from the top or hoof side, thus giving the spur a firm, secure seat directly in the shoe. When the spur-head is inserted in its socket and the shoe applied the straight portion of the spur which carries the weight is brought close to and parallel with the wall of the hoof, and the toe of the hoof fits into the bend *x* and prevents the spur from leaving the socket, as will be clear from the drawings. The weight D slides over the spur, preferably until it strikes the bent portion, and is held in place by a pin or strap, E, which passes through the aperture *d* in the weight and the notch *a* in the spur.

It will be observed that the weight is supported entirely by the shoe and cannot possibly rest upon the wall of the hoof, and that no burning or cutting of the hoof is necessary. The spur may be taken from its socket when the shoe is removed, and the same spur and weight used upon successive shoes until the tapering head is entirely worn off.

Spurs may be applied to the shoe either at the toe or side, and the weights, being removable, may be used or not, as is desirable.

Of course the head and socket, instead of being tapering, may be shouldered, so as to support the spur firmly on the shoe; but I prefer the arrangement shown and described.

I am aware that a spur carrying a weight has been connected with a shoe by slipping a tapering dovetail head on the spur into a correspondingly-shaped socket from the bottom of the shoe; but such a construction is objectionable, for the reason that it allows the spur and weight to settle and rest on the hoof of the animal, which renders him timid in handling his feet, as above mentioned.

I am also aware that it is not new, broadly, to support a weight upon a spur inserted in a socket in the top of the shoe; but the construction has been different from that herein described, and, so far as I am aware, the weight has rested upon the hoof, and a notch or recess has been burned or cut therein to accommodate the spur.

Having described my invention, what I claim is—

1. The spur A, formed, as described, with the bend or recess, in which the toe of the hoof rests, between its straight portion and the dovetail head B, in combination with a shoe having a socket, in which the head B flushly fits, and in which it is inserted from the upper or hoof side, substantially as set forth.

2. The combination of the notched spur, the weight which slides thereon, having the aperture through it, and the strap or pin for fastening them together, substantially as set forth.

In testimony whereof I have hereunto subscribed my name this 26th day of September, A. D. 1881.

JOHN HARNEY.

Witnesses:
GEO. L. FISHER,
WM. SCHMIDT.